(12) United States Patent
Kapoor et al.

(10) Patent No.: US 7,076,748 B2
(45) Date of Patent: Jul. 11, 2006

(54) IDENTIFICATION AND IMPLEMENTATION OF CLOCK GATING IN THE DESIGN OF INTEGRATED CIRCUITS

(75) Inventors: Bhanu Kapoor, Richardson, TX (US); Sanjay Churiwala, Noida (IN); Joy Banerjee, Noida (IN)

(73) Assignee: Atrenta Inc., San Jose, CA (US)

( * ) Notice: Subject to any disclaimer, the term of this patent is extended or adjusted under 35 U.S.C. 154(b) by 298 days.

(21) Appl. No.: 10/631,755

(22) Filed: Aug. 1, 2003

(65) Prior Publication Data

US 2005/0028118 A1 Feb. 3, 2005

(51) Int. Cl.
*G06F 17/50* (2006.01)

(52) U.S. Cl. .................. 716/4; 716/1; 716/5; 716/6
(58) Field of Classification Search .............. 716/1, 716/2, 4–7, 10, 12, 17, 18; 715/517; 713/400, 713/300; 703/19, 14
See application file for complete search history.

(56) References Cited

U.S. PATENT DOCUMENTS

| | | | |
|---|---|---|---|
| 5,585,745 A | 12/1996 | Simmons et al. | |
| 5,623,418 A * | 4/1997 | Rostoker et al. | 716/1 |
| 5,740,087 A | 4/1998 | Smentek et al. | |
| 5,980,092 A | 11/1999 | Merryman et al. | |
| 6,049,883 A | 4/2000 | Tjandrasuwita | |
| 6,167,561 A * | 12/2000 | Chen et al. | 716/18 |
| 6,204,695 B1 | 3/2001 | Alfke et al. | |
| 6,240,542 B1 * | 5/2001 | Kapur | 716/12 |
| 6,272,667 B1 | 8/2001 | Minami et al. | |
| 6,324,679 B1 * | 11/2001 | Raghunathan et al. | 716/18 |
| 6,429,698 B1 | 8/2002 | Young | |
| 6,434,704 B1 | 8/2002 | Dean et al. | |
| 6,567,962 B1 * | 5/2003 | Baumgartner et al. | 716/6 |
| 2003/0140318 A1 * | 7/2003 | Kitahara et al. | 716/1 |
| 2004/0123258 A1 * | 6/2004 | Butts | 716/5 |
| 2004/0225978 A1 * | 11/2004 | Fan et al. | 716/6 |
| 2004/0250227 A1 * | 12/2004 | Lin | 716/7 |

* cited by examiner

*Primary Examiner*—A. M. Thompson
*Assistant Examiner*—Helen Rossoshek
(74) *Attorney, Agent, or Firm*—Sughrue Mion, PLLC (57) ABSTRACT

Identification and implementation of clock gating in the design of an integrated circuit (IC) is performed with automated assistance. Electrical power consumption is reduced by clock gating. The automated assistance identifies registers that are candidates for clock gating, and highlights, in the IC design, registers associated with a gated clock domain and the logic blocks driven by these registers.

46 Claims, 11 Drawing Sheets

IDENTIFICATION AND IMPLEMENTATION OF CLOCK GATING IN THE DESIGN OF INTEGRATED CIRCUITS

FIELD OF THE INVENTION

The present invention relates generally to the design of ICs using a gated clock design technique, and more particularly to the low power IC design.

BACKGROUND OF THE INVENTION

In recent years, the size of integrated circuits (ICs) has dramatically increased in both size and number of transistors, resulting in higher power consumption. In typical IC designs, the clock distribution network, i.e., the clock tree, can consume from twenty to fifty percent of an IC's total active power. One important technique for reducing power consumption in IC designs is to reduce the power of an IC's clock distribution tree by gating portions of the IC that do not need to be clocked under certain conditions.

This process, known as "clock gating", disables the clocks fed to logic blocks of the IC when the logic blocks are not currently enabled or otherwise in active use. Power consumption due to the clocking of logic blocks that are not directly involved with the current operation of the IC is thereby minimized.

Figure 1:
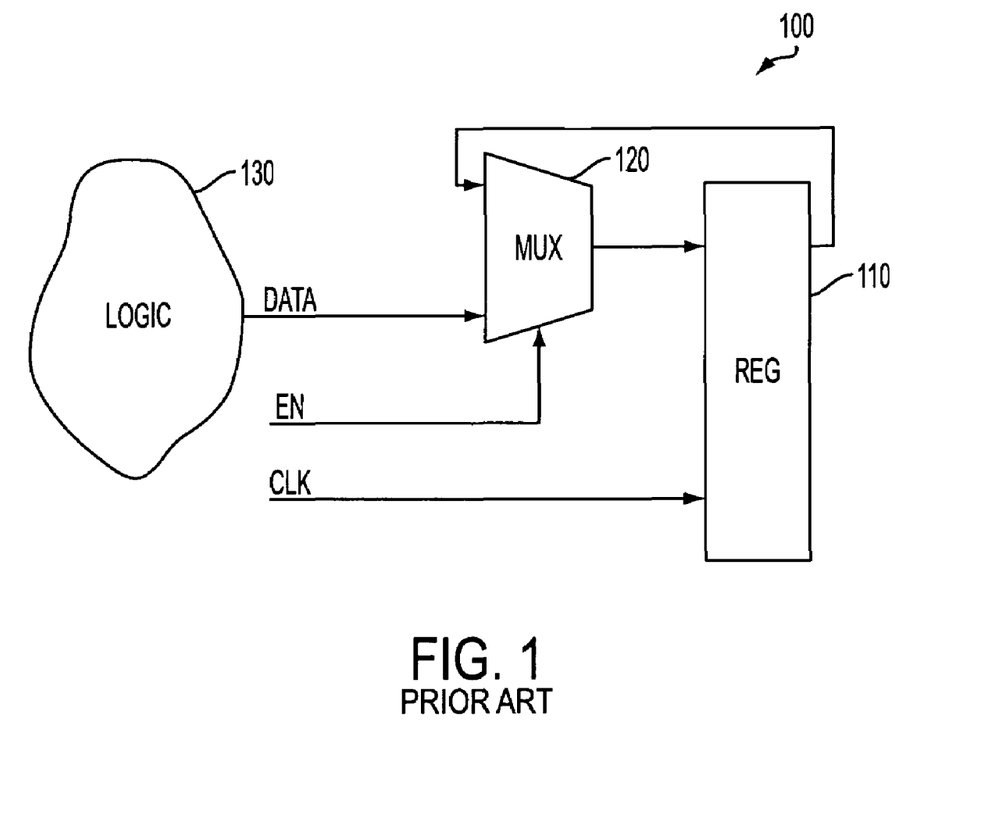
FIG. 1 is a prior art partial logic circuit which has not been clock gated.

Reference is now made to FIG. 1 that shows a partial logic circuit 100 that has not been clock gated. Circuit 100 includes a synchronous load-enable register 110 and a multiplexer (MUX) 120 implementing the load enabling. The clock input port provides the clock signal "CLK" which clocks register 110 every cycle. The enable port provides an enable signal "EN" that enables MUX 120, thereby allows data propagation from logic 130 to register 110. Obviously, there is no need to clock register 110 on every cycle, since the data at the input of register 110 does not change every clock cycle.

Figure 2:
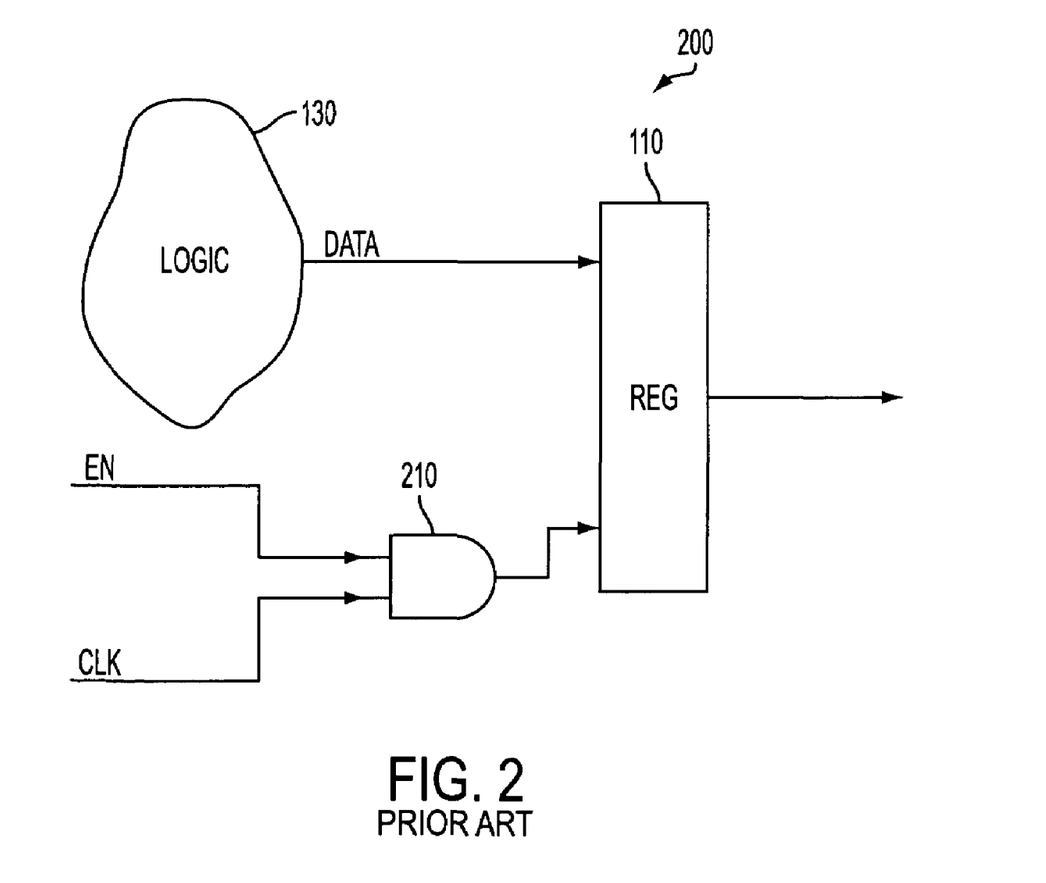
FIG. 2 is a partial logic circuit to which the clock gating technique is applied.

Reference is now made to FIG. 2 that shows a partial logic circuit 200 to which a clock gating technique is applied. In circuit 200, an AND gate 210 is used as the gating circuit. The clock and the enable ports are connected to AND gate 210 as its inputs. When the enable signal is set to a logic value '1', data is input to register 110 synchronously with the clock signal "CLK". On the other hand, when the enable signal is set to a logic value '0', data is not input to register 110 irrespective of the clock signal. Accordingly, when there is no need for loading data to register 110, unnecessary power consumption can be avoided by outputting the enable signals of a logic zero synchronously with the clock signal. The AND gate 210 controls the load enable signal of register 110 thus MUX 120 is eliminated from the circuit.

The clock gating technique has been well known as an effective technique for reducing the dynamic power of a system. In fact, the amount of dynamic power reduction depends on the number of registers that are gated and the percentage of time that the gated clock (i.e., the output of AND gate 210) is enabled.

The clock gating strategy of defining registers that can be clock gated and creating the clock gating control signals, is conducted manually, or through the use of computer aided design (CAD) tools. However, the ability to identify and define such registers in digital ICs is limited. Generally, the methods described in the related art designate, as candidates for clock gating, only logic blocks that include registers and multiplexers connected with a feedback loop. This limits the number of registers that can be gated and thus the amount of power saving.

In the view of the limitations in the related art, it would be advantageous to provide a more general method for identifying registers that are candidates for clock gating implementation.

SUMMARY OF THE INVENTION

Accordingly, according to various embodiments of the invention, there is provided for the identification and implementation of clock gating in an integrated circuit (IC), an inventive method, a computer executable code for implementation of the method, a computer system adapted to implement a clock gating recognition method, and also a visualization tool adapted to implement a method, for highlighting gated clock domains and gated/gate-able registers, intended for use in the design of an integrated circuit. Various embodiments of the invention provide efficiency improvements.

The invention is taught below by way of various specific exemplary embodiments explained in detail, and illustrated in the enclosed drawing figures.

BRIEF DESCRIPTION OF THE DRAWINGS

The drawing figures depict, in highly simplified schematic form, embodiments reflecting the principles of the invention. Many items and details that will be readily understood by one familiar with this field have been omitted so as to avoid obscuring the invention. In the drawings.

DETAILED DESCRIPTION

The invention will now be taught using various exemplary embodiments. Although the embodiments are described in detail, it will be appreciated that the invention is not limited to just these embodiments, but has a scope that is significantly broader. The appended claims should be consulted to determine the true scope of the invention.

Figure 3:
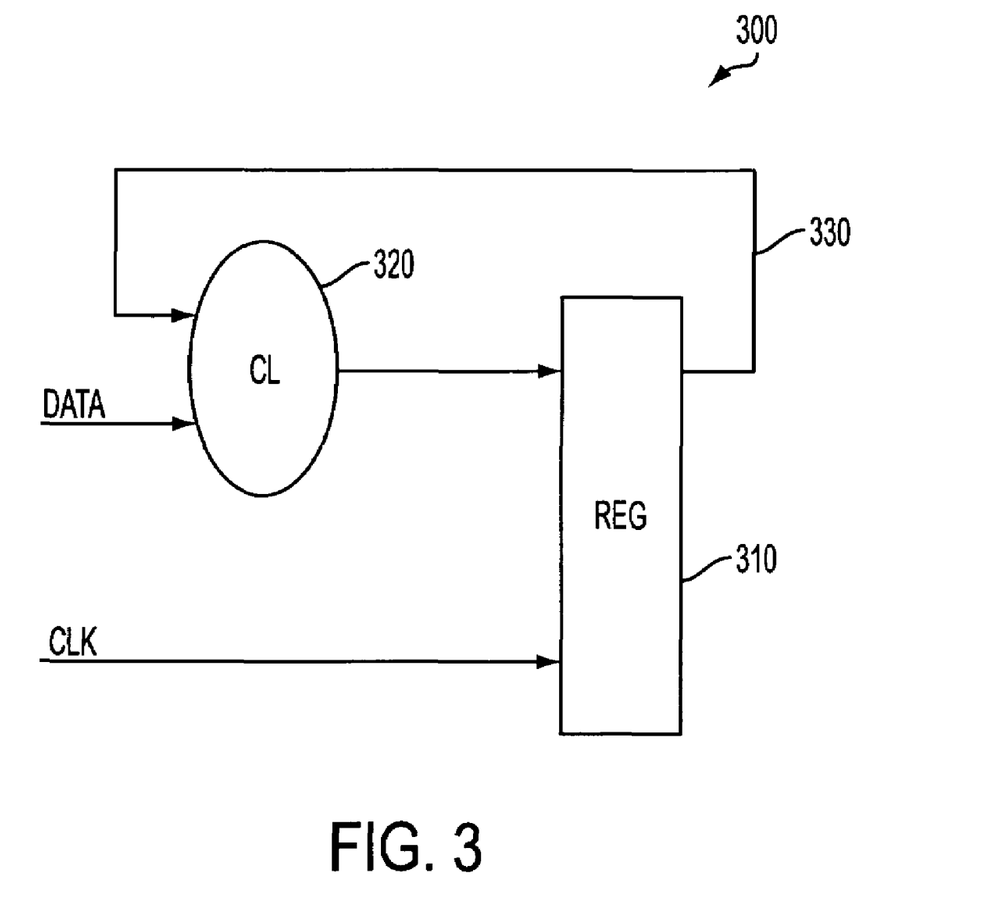
FIG. 3 is an exemplary logic circuit prior to the implementation of a clock gating modification in accordance with an embodiment of the invention.

Reference is now made to FIG. 3 where an exemplary logic circuit 300, prior to the implementation of a clock gating modification in accordance with the disclosed invention, is shown. Circuit 300 is a synchronous load-enabled circuit having a register controlled by a clock "CLK". The enable signals are generated by combinational logic (CL) 320 which are connected to register 310. The output pins of register 310 are connected to one or more of the input pins of CL 320 through a feedback loop 330. CL 320 comprises combinatorial interconnects of logical gates such as AND gates, OR gates, NAND gates, NOR gates, NOT gates, XOR gates, and Multiplexers to name a few, but specifically excludes memory components such as memory cells, flip-flops, and the like.

The input data is propagated through CL 320 to register 310. Register 310 is clocked using a clock signal "CLK". Since the data at the input of register 310 does not necessarily change every cycle, circuit 300 may be clock gated.

Figure 4:
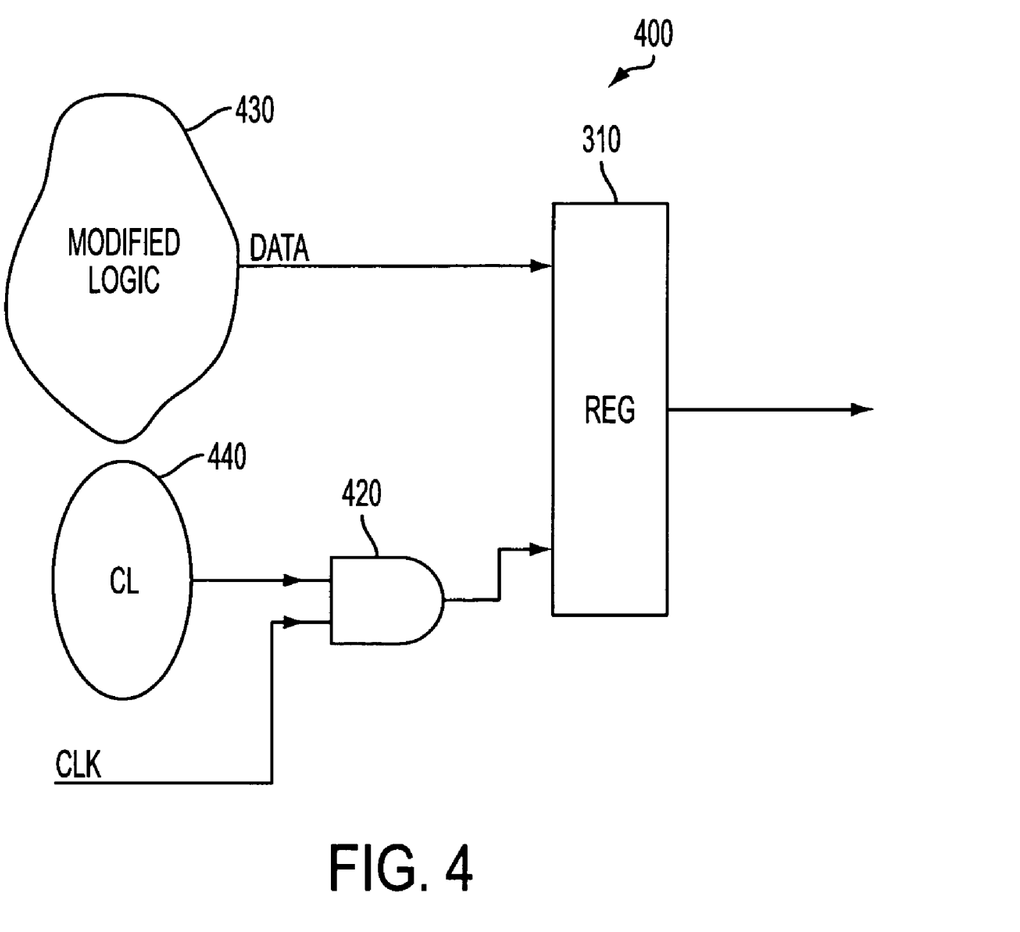
FIG. 4 is an exemplary resultant logic circuit which is clock gated in accordance with an embodiment of the invention.

To implement clock gating for circuit 300, the following steps are performed.
a) Registers with feedback loop are detected, as well as some other candidate registers (as described more fully below), in the circuit design. Here, register 310 having feedback loop 330 is a good example for a register that may be identified as a candidate for clock gating.
b) A determination is made as to the output function of the candidate register 310.
c) The logic conditions that provide the hold expressions that define the logic that fed data into the input of register 310, are determined. Hold expressions are described more fully, below.
d) The clock-gated circuit is formed. The resultant clock gated circuit 400 is shown in FIG. 4.

Circuit 400 includes a modified CL 440 which is derived from the gating conditions and the hold expressions. Modified CL 440 is connected to AND gate 420 which is further connected to receive the CLK signal. The output of AND gate 420 enables or disables the loading of the data into register 310 (the loading of the data into a register may also be referred to as "writing into" the register).

Logic 430 is derived from the logical conditions that define the output function of register 310. Logic 430 replaces the functionality of feedback loop 330, and preferably includes only the logic gates necessary for the data propagation. CL 440 ensures that register 310 is clocked only when data is to be loaded into register 310. Using this clock gating technique unnecessary power consumption is avoided.

Figure 5:
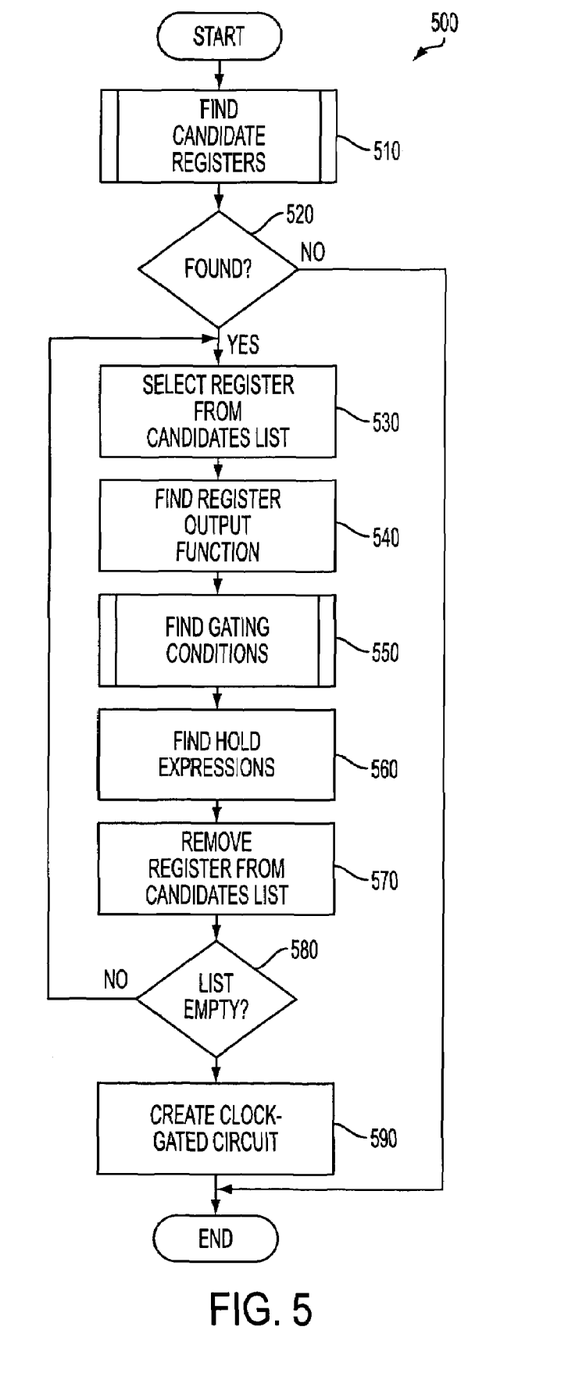
FIG. 5 is a flowchart for helping describe a method for implementing gated clock logic circuits in accordance with an embodiment of the invention.

Reference is now made to FIG. 5, which shows a flowchart 500 describing the method, according to one embodiment of the invention, for clock gating registers in the design of ICs. Although the examples presented herein include only a limited number of gates, this is for the purposes of a clear and succinct explanation; the methods according to the various embodiments of the invention are of course operative with respect to designs for ICs including a large number of logic gates and a large number of time domains.

At step 510, registers with a feedback loop as well as other registers that are likely candidates for clock gating, encountered in a given design, are identified. All the registers that are candidates for clock gating are saved in a temporary list (also referred to as the "candidates list"). A more detailed description of one implementation of step 510 is provided below with reference to FIG. 7.

At step 520, it is determined whether the candidates list is empty. If the list is empty, then execution ends. Otherwise, the execution continues with step 530. At step 530, a single candidate register is selected from the candidates list.

At step 540, the logical condition that results in data being held by the selected register, i.e., the logical condition that defines the output function of the selected register, is determined.

Figure 6:
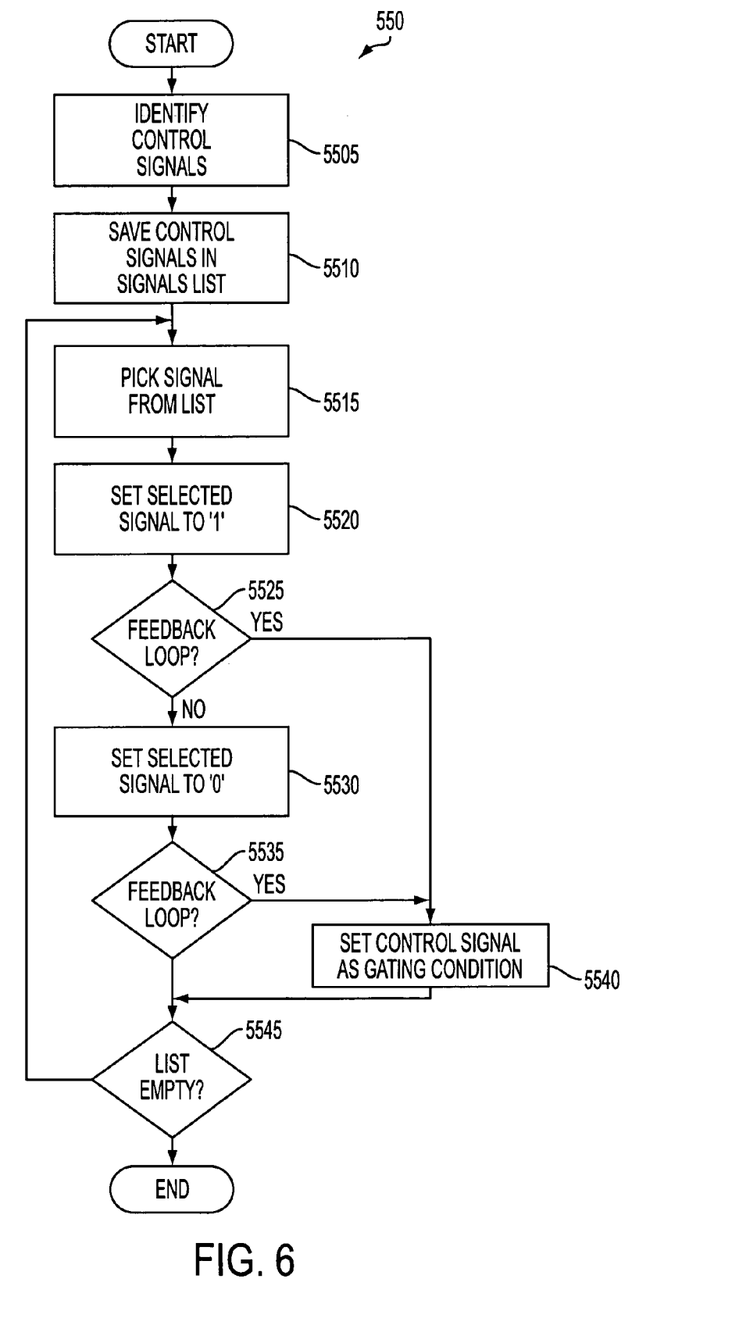
FIG. 6 is a flowchart showing in more detail one of the steps shown in FIG. 5, namely, the step of determining the gating conditions.

At step 550, the gating conditions for the selected register are determined. FIG. 6 shows a flowchart of one embodiment according to the invention for implementing the execution of step 550 is shown. In FIG. 6, at step 5505, the control signals of the feedback loop are identified. Bus signals are not considered as control signals.

At step 5510, all the control signals that were identified are saved in a temporary list.

At step 5515, a single control signal is picked (and removed) from the list.

At step 5520, the selected control signal is set to a logic one value ('1').

At step 5525, it is determined whether the control signal having the value '1' creates a simple feedback loop around the selected register. The feedback loop should not include any combinational logic components in the path, except for gates whose functions become equivalent to simple buffers as a result of setting the control value. If the simple feedback loop determination is in the affirmative; then it is determined that the control signal provides the gating condition for the clock associated with the tested register. In this case, the execution continues at step 5540.

When the simple feedback loop determination is not affirmative, execution continues with step 5530. At step 5530, the control signal is set to logical value '0'.

At step 5535, another test is performed to determine whether the control signal having the value '0' creates a simple feedback loop without any combinational logic components in the path, except for gates whose functions become equivalent to simple buffers as a result of setting the control value. That is to say, a subsequent feedback loop determination with the other binary value is made.

When the subsequent feedback loop determination is in the affirmative, then it is determined that the control signal having the value '0' provides the gating condition for the clock associated with the tested register. If neither of these cases is detected (i.e., neither a '0' nor a '1' binary value assigned to the selected control signal forms a simple feedback loop between the register output and register input), this control signal is not considered as a gating condition. To put it another way; the particular control signal is not a gating condition control signal.

At step 5545, a check is performed to determine if all the control signals were examined. If so the execution is ended, otherwise the execution continues at step 5515.

Referring back to FIG. 5, at step 560, the hold expressions are determined. Hold expressions are the remaining logical expressions being fed into the data input of the selected register, after the register output function has been evaluated with respect to the clock gating conditions. Hold expressions define the logic conditions for propagating data to a candidate register.

At step 570, the selected register, having been processed, is removed from the candidates list. At step 580, a check is performed to determine whether the candidates list is empty, namely if all the candidate registers were examined. If so, execution continues at step 590, otherwise execution continues at step 530.

At step 590, the clock gated circuits are formed by gating the registers. In any design, gating the registers results in the formation of a number of gated clock domains. In one embodiment of the present invention, the method highlights the registers associated with a gated clock domain and the logic blocks driven by these registers. Identifying gating conditions in a large design may result in hundreds of clock domains, and having a tool for visualization helps designers investigate the part of the IC design impacted by the introduction of a gated clock detected using the method described above.

The methods according to the embodiments of the invention can further be embodied by one familiar with this field as part of a computer software program, a computer aided design (CAD) system, a CAD program, and the like.

Figure 7:
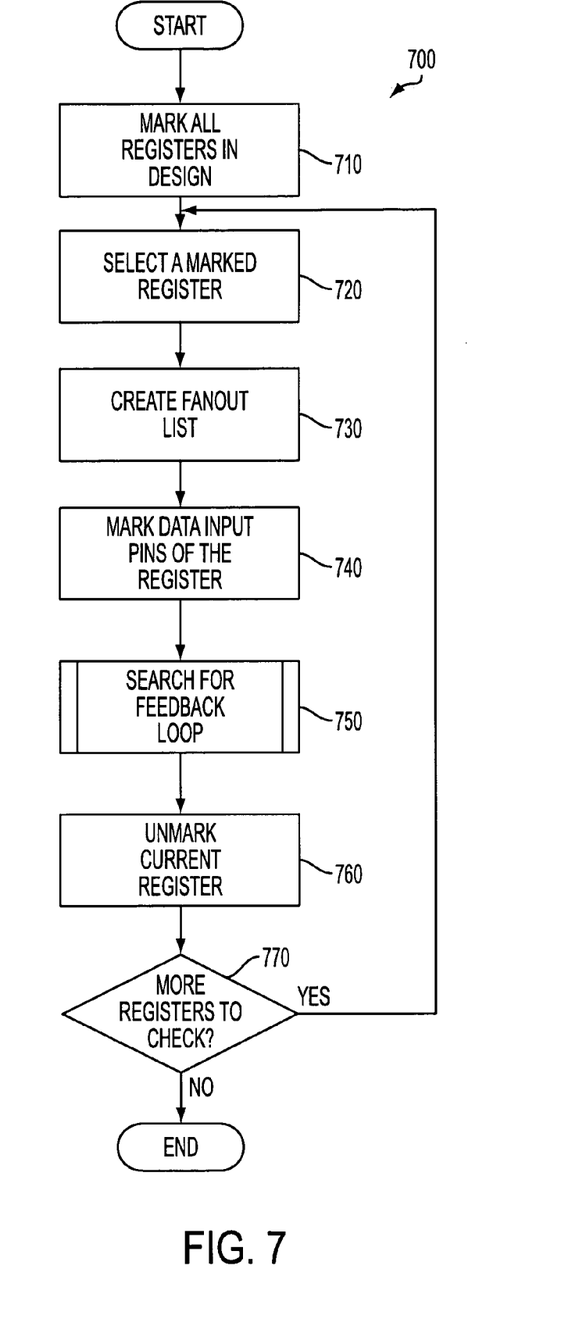
FIG. 7 is a flowchart describing the method for identifying registers that are candidates for clock gating, according to an embodiment of the invention.

A description of an IC design method 700 for identifying registers that are candidates for clock gating, in accordance with an embodiment of the invention, will now be given with reference to FIG. 7. According to this embodiment of the invention, the method detects the candidate registers using a synthesized netlist produced by an IC synthesis tool.

Synthesis tools produce gate level netlists based on the register transfer level (RTL) statements. Netlists generally include logical gates such as AND, NAND, NOR, OR, XOR, NXOR, and the likes. One such synthesis tool is described in the copending US patent application entitled, "An Apparatus and Method for Handling of Multi-Level Circuit Design Data", Ser. No. 10/118,242, assigned to the same assignee as the present application. The application Ser. No. 10/118,242 is hereby incorporated by reference in its entirety for all purposes, especially for its useful background information concerning a synthesis tool that produces gate level netlists based on RTL statements.

At step 710, all the registers in the design are marked as candidates for clock gating. At step 720, a single marked register is selected. At step 730, there is created a list of nets connected to the register fanout (hereinafter "fanout list") of the currently marked register. The fanout is the output terminals on a register or the net attached to an output terminal.

At step 740, all the input data pins of the selected register are marked. At step 750, for each net in the fanout list, the method identifies a feedback loop connected between the net and the data input pins. The feedback loop should exclude combinational logic elements.

Figure 8:
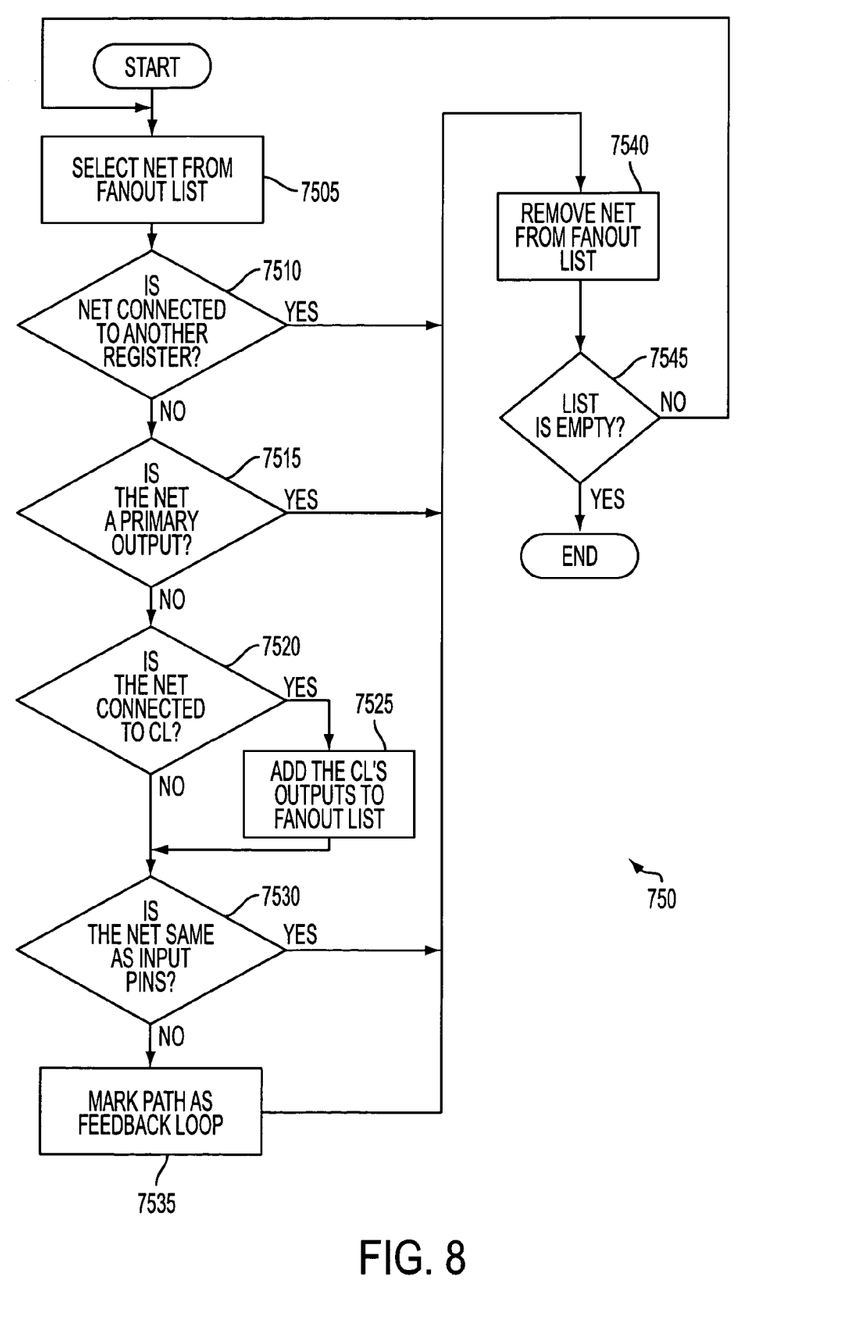
FIG. 8 is a flowchart showing in more detail the step of searching for feedback loops, according to an embodiment of the invention.

FIG. 8 is a flowchart depicting an embodiment, according to the invention, for performing the execution of step 750. At step 7505, a single net from the fanout list belonging to the tested register is selected. At step 7510, a check is performed to determine if the selected net is connected to a sequential element, i.e., another register. This check may be referred to as a sequential element check.

When the sequential element check result is affirmative, execution continues at step 7540 where the current net is removed from the fanout list, namely the search for the feedback loop for this net is terminated. When the sequential element check result is negative, execution continues at step 7515.

At step 7515, a check is performed to determine whether the selected net is a primary output (e.g., port) of the IC. That is to say, a primary output check is performed. When the primary output check result is affirmative, execution continues at step 7540, otherwise, execution continues with step 7520.

At step 7520, a check is performed to determine whether the selected net is connected to a combinational logic element. That is to say, a combinational logic element connection check is performed. When the combinational logic element connection check result indicates that the selected net is connected to a combinational logic element, then at step 7525, all the nets attached to the combinational logic element are added to the fanout list. When there is more than one combinational logic element, then step 7525 is repeated for each combinational logic element connected to the selected net.

At step 7530, the selected net is checked to determine whether it is the same as one of the data input pins of the register (these were marked in step 740). That is to say, an input pin identity check is performed. The result of the input pin identity check indicates whether a feedback loop exists between the register output pins and any of the data input pins.

When the input pin identity check result is affirmative (i.e., when the input pin identity check result indicates the presence of a feedback loop), execution continues with step 7535. When the result indicates no feedback loop, execution continues with step 7540. At step 7535, the data path between the register output pins and the data input pins is marked as feedback loop.

All the information of nets related to data paths being searched for feedback loops is maintained.

At step 7540, the current analyzed net is removed from the fanout list. At step 7545, a check is performed to determine if all the nets in the fanout list were analyzed and, if so, the execution is terminated; otherwise, the execution continues with step 7505.

Referring back to FIG. 7, at step 760 the currently examined register is unmarked. At step 770, a check is performed to determine if there are more marked candidate registers to examine and, if there are, execution continues with step 720; otherwise, execution is terminated.

Another embodiment of the invention, method 700 further identifies registers without a feedback loop as candidates for clock gating. Such registers may be registers with common enable signals and clock inputs present across various units in the IC design. In such cases shared enable signals set as the hold conditions for tested gated clock in the IC design. In addition, registers with fanout of higher than a specified threshold are also identified as possible candidates for clock gating, since such registers tend to impact large portions of the design. The threshold in this cases is a user specified parameter. The hold conditions in such cases are manually determined through conditions described in the architectural specification of the IC design.

Another embodiment of the invention uses some heuristics in method 700 to eliminate certain feedback paths identified as candidates for clock gating. For example, if the feedback path contains only an inverter, then it is considered to be a derived clock and eliminated as a candidate for clock gating. As another example, if the feedback path contains either an incrementer (i.e., a basic the binary adder), decrementer, or any arithmetic operations with one of the operands as constants, then it is eliminated as a candidate for clock gating.

Figure 9:
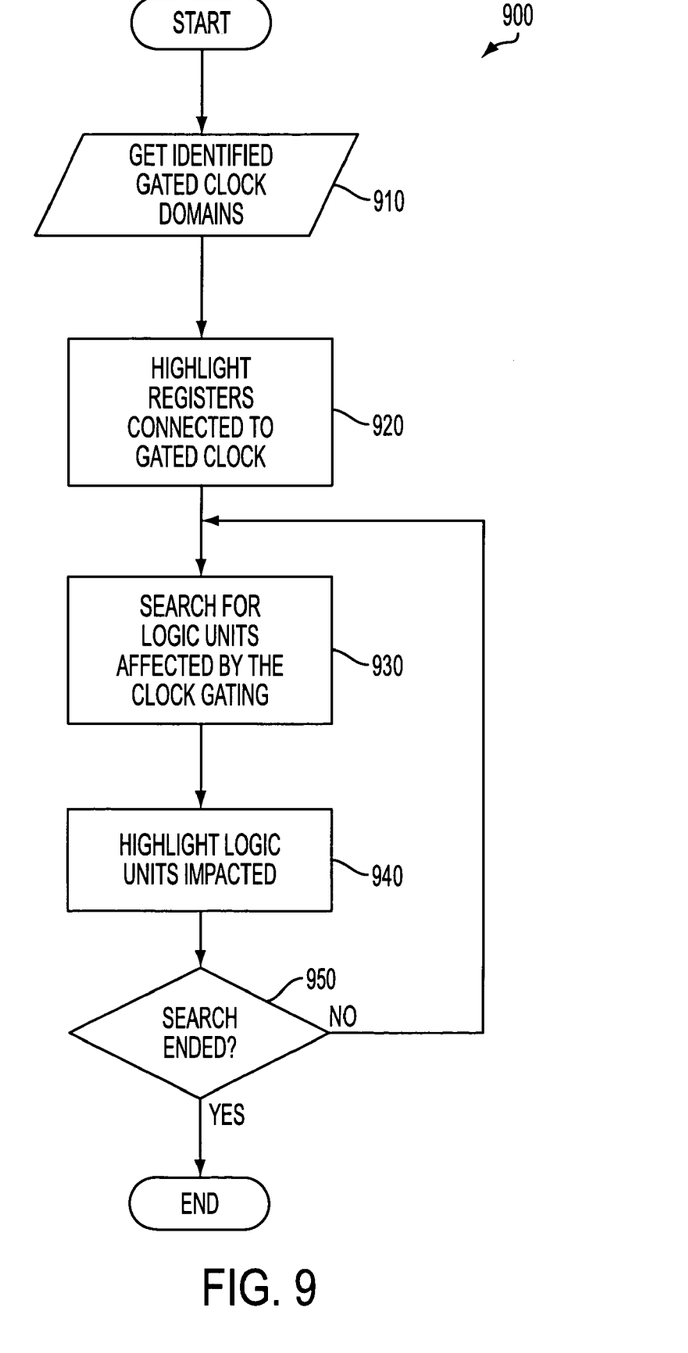
FIG. 9 is a flowchart describing in more detail the method for highlighting clock gated registers in the design, according to an embodiment of the invention.

Reference is now made to FIG. 9, which shows a flowchart 900 of the operation of a visualization tool in accordance with one embodiment of the present invention. The visualization tool highlights the registers associated with the gated clock domains and the logic blocks driven by these registers. This provides the user an easy way to recognize the gated registers in the IC design. At step 910, all clock domains identified using the process described above are received as an input.

At step 920, for each gated clock the registers connected to the gated clock are highlighted in the design. At step 930, a search for the logic units affected by the clock gating is performed. The search is performed by tracing forward from each of the registers highlighted at step 920. The affected logic units are logic units that are connected to the gated registers in the path of the fanouts (i.e., outputs) of the gated registers.

At step 940, the affected logic units detected at step 930 are further highlighted. At 950, a check is performed to determine if the search comes across the next set of gated registers. If so, execution is terminated; otherwise, execution continues with step 930. In one particular embodiment, the visualization tool allows control of the number of levels that can be highlighted, using a user-specified parameter. For example, the user may want to highlight up to only the first units affected by a gated register and this is indicated as a first level of highlighting.

Figure 10:
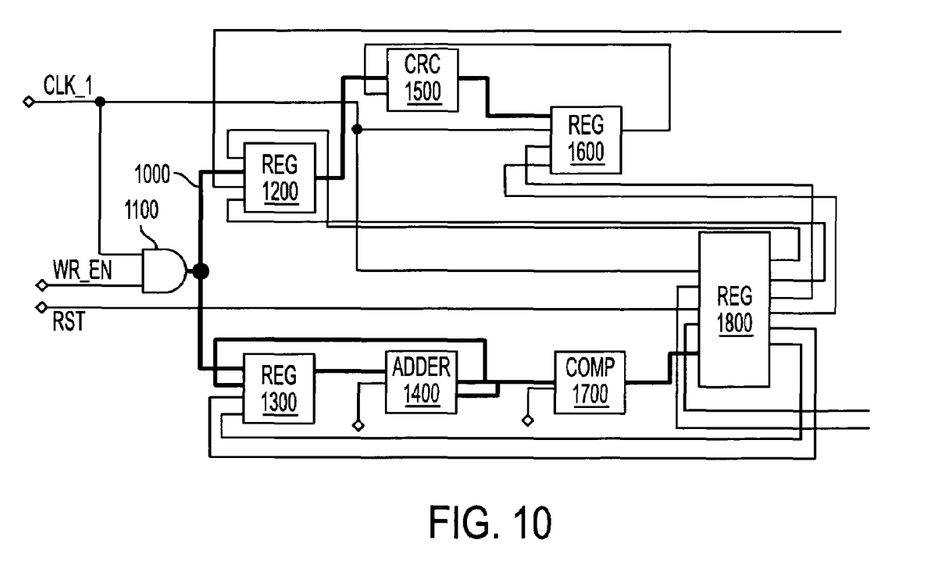
FIG. 10 is a portion of a logic circuit design, used to explain an exemplary application of a highlighted clock gated register design methodology.
Figure 11:
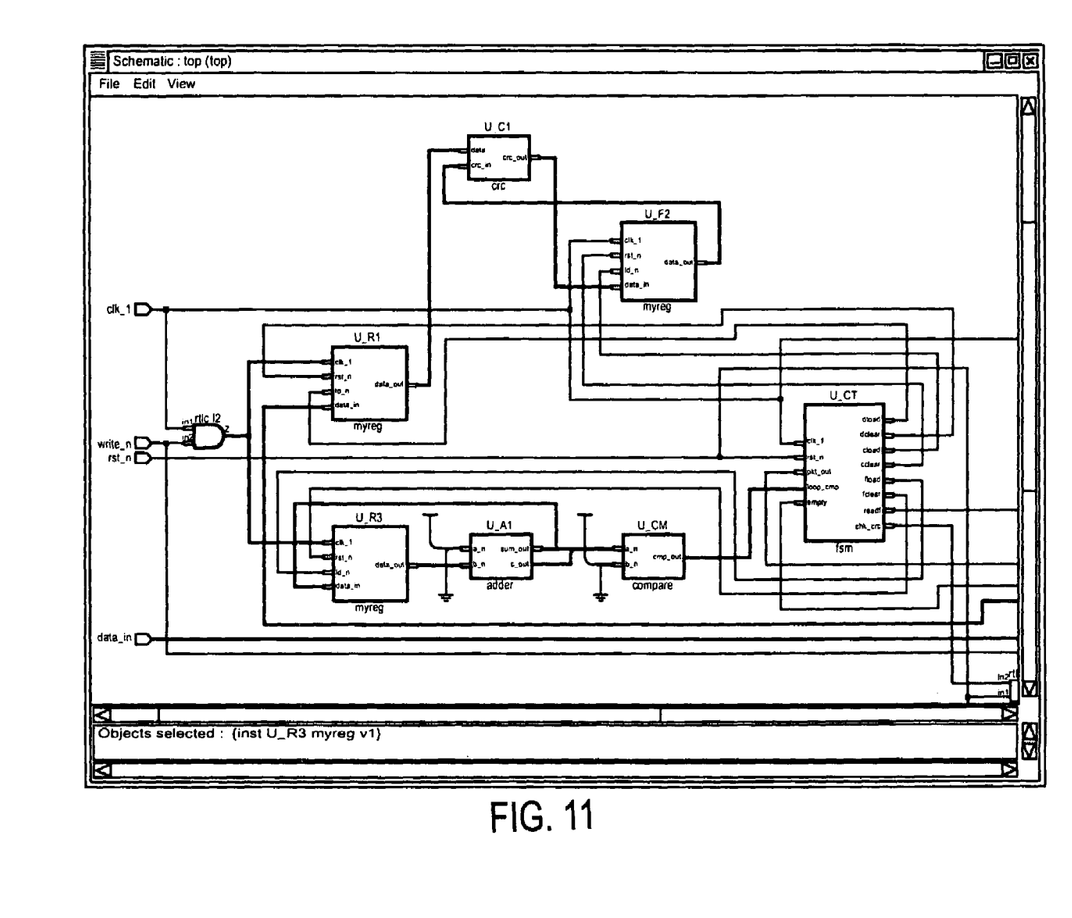
FIG. 11 is an exemplary screenshot according to an embodiment of the invention featuring a design methodology visualization tool.

FIG. 10 shows a portion of logic circuit design highlighted using the method described above. The logic circuit is clocked using the signal "CLK_1". First, the gated clock 1000 is highlighted. Second, all the registers which gated clock 1000 feeds into, e.g., registers 1200 and 1300 are highlighted. Next, all the logic units connected to registers 1200 and 1300 affected by the clock gating are further highlighted. As shown in FIG. 10, the logic units impacted by clock gating register 1300 are adder 1400 and comparator 1700, while the logic unit impacted by clock gating register 1200 is CRC unit 1500. Registers 1600 and 1800 are not highlighted, since gated clock 1000 does not act upon these registers. As mentioned above, the user may set the number of levels to be highlighted, for example, if the user set this number to 1, then only CRC unit 1500 and adder 1400 will be highlighted. Any visualization tool that implements the method described herein may highlight and color the gated clock and the various logic components with different colors. An exemplary screenshot outputted by such a visualization tool is shown in FIG. 11.

One familiar with this field will understand that the term "register" can mean any logic component for holding data. For example, a register could be any type of flip-flop, memory cell, combinational logic loops that form a de-facto memory, and the like.

Many variations to the above-identified embodiments are possible without departing from the scope and spirit of the invention. Possible variations have been presented throughout the foregoing discussion. Combinations and subcombinations of the various embodiments described above will occur to those familiar with this field, without departing from the scope and spirit of the invention.

The invention claimed is:

1. An integrated circuit (IC) design method, intended for reducing IC power consumption by the efficient identification and implementation of register clock gating in an IC design, comprising:
   identifying candidate registers to be clock gated; and
   for each of the candidate registers:
      determining an output function of the candidate register;
      determining at least one gating condition for the candidate register;
      determining at least one hold expression for the candidate register;
      performing a feedback loop identification step for the candidate register, including identifying a feedback loop that is free of combinational logic elements, except for combinational logic elements having a function that becomes equivalent to a buffer as a result of setting a control value; and
      based on the result of the determining of the output function, the gating condition, and the hold expression, and the identification of the feedback loop, clock gating the candidate register.

2. The IC design method as set forth in claim 1, further comprising: identifying gated clock domains in the IC design; and highlighting, in a visual display of the IC design, the gated clock domains.

3. The IC design method as set forth in claim 2, wherein highlighting the gated clock domains further comprises highlighting the candidate registers and logic units connected to the candidate registers.

4. The IC design method as set forth in claim 3, wherein the highlighting of the candidate registers and the logic units: for each gated clock domain, highlighting registers connected to the gated clock; tracing forward from each highlighted register to detect the logic units affected by clock gating the highlighted register; and, highlighting the affected logic units.

5. The IC design method as set forth in claim 4, wherein the affected logic units are the logic units in a path between: the highlighted register, and a next set of registers belonging to a different gated clock domain.

6. The IC design method as set forth in claim 1, wherein the identifying, of the candidate registers to be clock gated, includes selecting a register with a fanout higher than a predetermined threshold.

7. The IC design method as set forth in claim 1, wherein the combinational logic elements include AND gates, OR gates, NAND gates, NOR gates, NOT gates, XOR gates, and multiplexers.

8. The IC design method as set forth in claim 1, wherein the hold expression defines logic conditions for propagating data to the candidate register.

9. The IC design method as set forth in claim 1, wherein the gating condition controls data loading to the candidate register.

10. The IC design method as set forth in claim 9, wherein the step of determining of the at least one gating condition for the candidate register comprises:
   identifying control signals controlling the load of data to the candidate register;
   for each of the identified control signals:
      setting the control signal to a first binary value;
      performing a feedback loop determination with the control signal having the first binary value;
      when the feedback loop determination indicates a feedback loop, determining that the control signal with the first binary value provides the gating condition;
      when the feedback loop determination does not indicate a feedback loop, setting the control signal to the opposite binary value of said first binary value;
      performing a subsequent feedback loop determination; and
      when the subsequent feedback loop determination indicates a feedback loop, determining that the control signal with the opposite binary value provides the gating condition.

11. The IC design method for claim 1, wherein the identifying of the candidate registers comprises, for each one of the registers in the IC design: creating a list of logic nets connected to the fanouts of the register; searching for a feedback loop connected between the fanouts and the input pins of the register; and when the result of the searching indicates the finding of the feedback loop, determining the register to be a candidate register.

12. The IC design method as set forth in claim 11, wherein the searching for the feedback loop comprises, for each logic net of the list of logic nets: performing a combinational logic element connection check of the logic net; when the combinational logic element connection check indicates the logic net is connected to combinational logic, adding the outputs of the combinational logic to the list of logic nets; performing an input pin identity check for the logic net and the input pins of the register; and when the input pin identity check result indicates no feedback loop is present for the logic net, removing the logic net from the list of logic nets.

13. The IC design method as set forth in claim 1, wherein the clock gating of the candidate register comprises: forming a first combinational logic net based on the gating condition and the hold expression; forming a second combinational logic net based on the output function; using the first combinational logic net and the clock signal as inputs to a logical AND function; providing the output of the logical AND to the candidate register; and connecting the second combinational logic net to the candidate register.

14. The IC design method as set forth in claim 13, wherein the clock signal is used to clock the candidate register.

15. The IC design method as set forth in claim 1, implemented in one of a computer aided design (CAD) system and a CAD program.

16. The method as set forth in claim 1, wherein the identifying of the candidate registers to be clock gated comprises:
creating a list of logic nets connected to the fanouts of the register;
searching for a feedback loop connected between the fanouts and the input pins of the register; and
when the result of the searching indicates the finding of the feedback loop, determining the register to be a candidate register.

17. The method as set forth in claim 16, wherein the searching for the feedback loop comprises, for each logic net of the list of logic nets:
performing a combinational logic element connection check of the logic net;
when the combinational logic element connection check indicates the logic net is connected to combinational logic, adding the outputs of the combinational logic to the list of logic nets;
performing an input pin identity check for the logic net and the input pins of the register; and
when the input pin identity check result indicates no feedback loop is present for the logic net, removing the logic net from the list of logic nets.

18. The method as set forth in claim 17, wherein the feedback loop is free of combinational logic elements, the combinational logic elements include AND gates, OR gates, NAND gates, NOR gates, NOT gates, XOR gates, and multiplexers.

19. The method as set forth in claim 17, wherein highlighting the gated clock domains further comprises highlighting the candidate registers and logic units connected to the candidate registers.

20. A computer program product for enabling a computer system to perform operations for an integrated circuit (IC) design method, intended for reducing IC power consumption by the efficient identification and implementation of register clock gating in an IC design, the computer program product having computer instructions on a computer readable medium, the operations comprising:
identifying candidate registers to be clock gated; and
for each of the candidate registers:
determining an output function of the candidate register;
determining at least one gating condition for the candidate register;
determining at least one hold expression for the candidate register;
performing a feedback loop identification step for the candidate register, including identifying a feedback loop that is free of combinational logic elements, except for combinational logic elements having a function that becomes equivalent to a buffer as a result of setting a control value; and
based on the result of the determining of the output function, the gating condition, and the hold expression, clock gating the candidate register.

21. The computer program product as set forth in claim 20, wherein the operations further comprise:
identifying gated clock domains in the IC design; and
highlighting, in a visual display of the IC design, the gated clock domains.

22. The computer program product as set forth in claim 21, wherein highlighting the gated clock domains further comprises highlighting the candidate registers and logic units connected to the candidate registers.

23. The computer program product as set forth in claim 22, wherein the highlighting of the candidate registers and the logic units: for each gated clock domain, highlighting registers connected to the gated clock; tracing forward from each highlighted register to detect the logic units affected by clock gating the highlighted register; and, highlighting the affected logic units.

24. The computer program product as set forth in claim 23, wherein the affected logic units are the logic units in a path between: the highlighted register, and a next set of registers belonging to a different gated clock domain.

25. The computer program product as set forth in claim 20, wherein the identifying, of the candidate registers to be clock gated, includes selecting a register with a fanout higher than a predetermined threshold.

26. The computer program product as set forth in claim 20, wherein the combinational logic elements include AND gates, OR gates, NAND gates, NOR gates, NOT gates, XOR gates, and multiplexers.

27. The computer program product as set forth in claim 20, wherein the hold expression defines logic conditions for propagating data to the candidate register.

28. The computer program product as set forth in claim 20, wherein the gating condition controls data loading to the candidate register.

29. The computer program product as set forth in claim 28, wherein the step of determining of the at least one gating condition for the candidate register comprises:
identifying control signals controlling the load of data to the candidate register; for each of the identified control signals:
setting the control signal to a first binary value;
performing a feedback loop determination with the control signal having the first binary value;

when the feedback loop determination indicates a feedback loop, determining that the control signal with the first binary value provides the gating condition;
when the feedback loop determination does not indicate a feedback loop, setting the control signal to the opposite binary value of said first binary value;
performing a subsequent feedback loop determination; and
when the subsequent feedback loop determination indicates a feedback loop, determining that the control signal with the opposite binary value provides the gating condition.

30. The computer program product for claim 20, wherein the identifying of the candidate registers comprises, for each one of the registers in the IC design: creating a list of logic nets connected to the fanouts of the register; searching for a feedback loop connected between the fanouts and the input pins of the register; and when the result of the searching indicates the finding of the feedback loop, determining the register to be a candidate register.

31. The computer program product as set forth in claim 30, wherein the searching for the feedback loop comprises, for each logic net of the list of logic nets: performing a combinational logic element connection check of the logic net; when the combinational logic element connection check indicates the logic net is connected to combinational logic, adding the outputs of the combinational logic to the list of logic nets; performing an input pin identity check for the logic net and the input pins of the register; and when the input pin identity check result indicates no feedback loop is present for the logic net, removing the logic net from the list of logic nets.

32. The computer program product as set forth in claim 20, wherein the clock gating of the candidate register comprises: forming a first combinational logic net based on the gating condition and the hold expression; forming a second combinational logic net based on the output function; using the first combinational logic net and the clock signal as inputs to a logical AND function; providing the output of the logical AND to the candidate register; and connecting the second combinational logic net to the candidate register.

33. The computer program product as set forth in claim 32, wherein the clock signal is used to clock the candidate register.

34. The computer program product as set forth in claim 20, implemented in one of a computer aided design (CAD) system and a CAD program.

35. A computer system for performing an integrated circuit (IC) design method, intended for reducing IC power consumption by the efficient identification and implementation of register clock gating in an IC design, the computer system having a processor and a memory under control of the processor, the memory including software instructions for performing operations comprising:
identifying candidate registers to be clock gated; and
for each of the candidate registers:
determining an output function of the candidate register;
determining at least one gating condition for the candidate register;
determining at least one hold expression for the candidate register; and
performing a feedback loop identification step for the candidate register, including identifying a feedback loop that is free of combinational logic elements, except for combinational logic elements having a function that becomes equivalent to a buffer as a result of setting a control value; and
based on the result of the determining of the output function, the gating condition, and the hold expression, and the identification of the feedback loop, clock gating the candidate register.

36. The computer system as set forth in claim 35, wherein the identifying, of the candidate registers to be clock gated, includes selecting a register with a fanout higher than a predetermined threshold.

37. The computer system as set forth in claim 35, wherein the gating condition controls data loading to the candidate register.

38. The computer system as set forth in claim 35, wherein the step of determining of the at least one gating condition for the candidate register comprises:
identifying control signals controlling the load of data to the candidate register;
for each of the identified control signals:
setting the control signal to a first binary value;
performing a feedback loop determination with the control signal having the first binary value;
when the feedback loop determination indicates a feedback loop, determining that the control signal with the first binary value provides the gating condition;
when the feedback loop determination does not indicate a feedback loop, setting the control signal to the opposite binary value of said first binary value;
performing a subsequent feedback loop determination with; and
when the subsequent feedback loop determination indicates a feedback loop, determining that the control signal with the opposite binary value provides the gating condition.

39. The computer system for claim 35, wherein the identifying of the candidate registers comprises, for each one of the registers in the IC design: creating a list of logic nets connected to the fanouts of the register; searching for a feedback loop connected between the fanouts and the input pins of the register; and when the result of the searching indicates the finding of the feedback loop, determining the register to be a candidate register.

40. The computer system as set forth in claim 39, wherein the searching for the feedback loop comprises, for each logic net of the list of logic nets: performing a combinational logic element connection check of the logic net; when the combinational logic element connection check indicates the logic net is connected to combinational logic, adding the outputs of the combinational logic to the list of logic nets; performing an input pin identity check for the logic net and the input pins of the register; and when the input pin identity check result indicates no feedback loop is present for the logic net, removing the logic net from the list of logic nets.

41. The computer system as set forth in claim 35, wherein the clock gating of the candidate register comprises: forming a first combinational logic net based on the gating condition and the hold expression; forming a second combinational logic net based on the output function; using the first combinational logic net and the clock signal as inputs to a logical AND function; providing the output of the logical AND to the candidate register; and connecting the second combinational logic net to the candidate register.

42. The computer system as set forth in claim 41, wherein the clock signal is used to clock the candidate register.

43. The computer system as set forth in claim 35, implemented in one of a computer aided design (CAD) system and a CAD program.

44. An integrated circuit visualization tool adapted to implement a method for highlighting gated clock domains and gated registers in a design of an integrated circuit (IC), the visualization tool comprising:

means for displaying the design of the IC;
   processing means controlling the means for displaying; and,
   a memory, under control of the processing means, including software instructions adapted to enable the processing means to perform the steps of:
      identifying the clock gated domains in the IC's design;
      for each the gated clock domain, highlighting registers that are connected to the gated clock;
      tracing forward from each of the highlighted register to detect logic units affected by clock gating of the highlighted register; and
      highlighting the affected logic units;
   wherein the memory further comprises software instructions adapted to enable the processing means to identify candidate registers to be clock gated, and, for each of the candidate registers: determining an output function of the candidate register; determining at least one gating condition for the candidate register; determining at least one hold expression for the candidate register; performing a feedback loop identification step for the candidate register, including identifying a feedback loop that is free of combinational logic elements, except for combinational logic elements having a function that becomes equivalent to a buffer as a result of setting a control value; and based on the result of the determining of the output function, the gating condition, and the hold expression, and the identification of the feedback loop, clock gating the candidate register.

45. The visualization tool of claim 44, wherein the affected logic units are the logic units in a path between the highlighted register and a next set of registers belonging to a domain different than the gated clock domain.

46. The visualization tool of claim 44, implemented as at least part of a computer aided design (CAD) system and a CAD program.

* * * * *